Patented June 30, 1936

2,045,625

UNITED STATES PATENT OFFICE 2,045,625

MANUFACTURE OF FERRIC SULPHATE

John F. White, Somerville, and William S. Wilson, Boston, Mass., assignors to Merrimac Chemical Company, Inc., Everett, Mass., a corporation of Massachusetts No Drawing. Application January 11, 1934,
Serial No. 706,250

7 Claims. (Cl. 23—126)

This invention relates to the manufacture of ferric sulphate and it deals particularly with the utilization of burnt pyrite and sulphuric acid as the raw materials in the preparation of the ferric sulphate in a manner whereby ferric sulphate may be obtained in good yields.

It is well known that oxides of iron will combine with sulphuric acid to form various sulphuric acid salts. These salts are of the ferrous as well as ferric type, and include a wide range of basic, neutral and acid salts. For certain purposes where ferric solutions are desired, the presence of ferrous iron is wasteful or objectionable. It is accordingly desirable that the ferric sulphate shall contain little, if any, ferrous sulphate. Moreover, the solubility of certain ferric sulphates, particularly the basic sulphates, is relatively low as a result of which they remain as a sludge or sediment which likewise is wasteful if not actually detrimental. Accordingly, the problem of producing ferric sulphate resolves itself into one of avoiding the production or formation of either the acid or basic ferric salts.

When iron pyrite is oxidized the sulphur present is converted into sulphur dioxide and the iron remains in the form of its oxide. But the process as conducted on a commercial scale does not result in the quantitative conversion of all of the sulphide into the oxide. Furthermore, the oxide is not all in a ferric state. A part of the iron in the form of oxide is present in a lower state of oxidation than that corresponding to ferric oxide. Moreover, much of the sulphur which remains in the cinder, of which there may be as much as 4% of that present in the original pyrite, is in the form of ferrous sulphide.

When one adds burnt pyrite to sulphuric acid under agitated conditions at a rate which approximates the rate of dissolution there is produced not only ferric sulphate but ferrous sulphate and some elemental sulphur. The amount of ferrous sulphate may under some conditions be as much as 25% of the total iron in solution. It is, of course, known that ferrous sulphate may be converted to ferric sulphate by the utilization of a suitable oxidizing agent. Thus, for example, it is common to convert copperas (ferrous sulphate) to its ferric state by the introduction of elemental chlorine. However, this procedure is costly and results in the contamination of the sulphate product with ferric chloride.

We have now found that it is possible to react iron pyrite cinder with sulphuric acid under conditions whereby little or no ferrous sulphate is formed and at the same time the necessity of utilizing oxidizing agents is avoided.

Thus, we have found that a large part of the ferrous sulphate results from the reaction of acid with iron sulphide which is present as an impurity, forming ferrous sulphate and hydrogen sulphide. The hydrogen sulphide which is liberated combines immediately with the ferric sulphate reducing the same to ferrous sulphate.

We have likewise found that the reactivity of the sulphide in the presence of acid is much greater than the reactivity of the ferric oxide and also that it is possible to cause the sulphide present in the cinder to react with the acid first before a substantial amount of ferric sulphate is formed whereby the hydrogen sulphide is evolved as such and its reaction with ferric sulphate is thereby obviated.

According to the present invention a pyrite cinder such as is obtained in the manufacture of sulphuric acid from iron pyrite is added in its entirety to fresh sulphuric acid whereby the hydrogen sulphide is immediately evolved and escapes from the reaction medium as a gas. The initial evolution of the hydrogen sulphide reduces the amount of ferrous sulphate which would otherwise form. The residue may then be treated with fresh acid whereupon the less soluble ferric oxide is dissolved. If, however, the relatively smaller amount of ferrous sulphate formed as a result of the reaction with ferrous sulphate is tolerable, it is unnecessary to perform the steps separately and one may introduce the pyrite cinder in the required amount of acid for complete dissolution thereof. The acid then reacts with the ferric oxide forming ferric sulphate and water. Rapid reaction of the iron sulphide with the acid and substantially complete evolution of the hydrogen sulphide are realized and a minimum of ferrous salts thereby obtained by maintaining the aqueous acid hot and of an initial concentration of approximately 36°–40° Bé. Higher or lower concentration impairs the rate of dissolution of the iron and increases the ferrous content of the product.

In practicing our invention we prefer to employ an excess of pyrite cinder over that which is required to combine with substantially all of the acid. Under these conditions the formation of acid sulphates is avoided and no difficulty has been experienced with the formation of basic sulphates. The resulting reacted mixture is permitted to settle whereby the unconsumed cinder may be separated from the ferric sulphate by decantation and subsequent washing.

A better understanding of the invention may be had from the following specific example which illustrates an embodiment thereof which may be preferred.

A tank equipped with an agitator is charged with wash water, the origin of which is more fully set forth hereinafter, and heated to approximately 90° C. after which sufficient sulphuric acid is added to produce an acid of approximately 35° Bé. at 117° C. The heat of dilution is sufficient to bring the temperature to the boiling point. The agitator is operated continuously while one adds as rapidly as the mechanical facilities permit, an amount of cinder which is approximately 20% greater than that theoretically required to consume all of the sulphuric acid. After agitating the mixture for approximately seven hours while maintaining the temperature at approximately the boiling point, the operation of the agitator is interrupted and a batch is permitted to settle over night. The boiling temperature will have been reduced during the reaction period from approximately 117° C. to 104° C.–105° C.

After the sedimentation, the clear liquor consisting mainly of neutral ferric sulphate is drawn off and the residue is washed by stirring for thirty minutes with fresh water. The suspension is then permitted to settle for a period of approximately two hours for each two feet of depth in the tank. The clear solution is decanted and used in diluting the fresh sulphuric acid in the first step of the process.

The volume of the mud from which the clear ferric sulphate solution is withdrawn will be approximately one-fourth of the total. The decanted liquor is approximately 50° Bé. and will show upon analysis to contain:

| | Percent |
|---|---|
| Total iron as $Fe_2O_3$ | 16.3 |
| Actual iron as $Fe_2O_3$ | 15.35 |
| Iron as $FeO$ | .86 |
| $SO_3$ in the form of free $H_2SO_4$ | 2.75 |
| Total $SO_3$ | 26.8 |

The foregoing analysis discloses less than 6% of the iron in the form of ferrous sulphate which is to be contrasted with a product which is obtained under conditions whereby the hydrogen sulphide is not eliminated such as by counter-current extraction or progressive addition of the cinder during the course of the acid extraction under which conditions more than 12% of the iron is present as ferrous sulphate. The amount of ferrous sulphate can be reduced further if the solution resulting from the preliminary reaction during which the hydrogen sulphide is evolved, be separated and fresh acid substituted. In such event the amount of acid required for the first reaction is reduced correspondingly.

It is to be understood that the invention is not dependent upon any particular source of sulphuric acid or any particular type of pyrite cinder. It is also to be understood that the cycle of operation, including the method of washing the sludge, the amount of excess cinder employed, the manner of separating the clear filtrate from the mud, etc., may be varied as is well understood by those skilled in the art.

For many purposes the solution obtained may be employed directly without further treatment. If desired, however, the material may be concentrated and dried within the spirit of the present invention.

We claim:

1. A method of producing water-soluble, substantially neutral ferric sulphate which comprises reacting sulfuric acid of about 35–40° Bé. with iron pyrite cinder consisting mainly of ferric oxide but containing material amounts of compounds of iron and sulphur which react with said acid more readily than does ferric oxide and thereby evolve hydrogen sulphide, the admixture of acid and cinder being substantially immediate and the hydrogen sulphide evolving compounds being preferentially dissolved to eliminate the hydrogen sulphide prior to substantial formation of ferric sulphate in the solution.

2. The method of producing ferric sulphate from pyrite cinder containing iron in a lower state of oxidation than that present in ferric oxide, as well as compounds of sulphur which react with acid to form hydrogen sulphide, which method comprises adding the cinder to sulphuric acid of approximately 36°–40° Bé. while maintaining the temperature near the boiling point, to evolve hydrogen sulphide and eliminate the same from the solution as a gas before substantial amounts of ferric sulphate are formed.

3. The method as defined in claim 2 and further characterized in that the cinder is added in an amount which is approximately 20% greater than that theoretically required for the formation of ferric sulphate by the acid which is employed.

4. The method of producing ferric sulphate comprising reacting pyrite cinder containing iron sulphides with sulphuric acid in two stages, the first stage involving initially adding only approximately sufficient acid to react with the sulphur compounds present in the cinder to liberate the sulphur as hydrogen sulphide, and after substantially complete evolution of the hydrogen sulphide, adding acid in sufficient amounts to react with the major portion of the ferric oxide present in the cinder.

5. A process as defined in claim 4 in which the acid used in the first stage of the process is decanted before the addition of the second portion of acid.

6. A process as defined in claim 4 in which the acid employed is of approximately 35° to 40° Bé.

7. A method of producing ferric sulphate comprising rapidly admixing pyrite cinder containing material amounts of sulphide materials capable of forming hydrogen sulphide when in contact with acid, with sulphuric acid of approximately 35° to 40° Bé. to evolve sulphur present in the cinder as hydrogen sulphide prior to the substantial formation of ferric sulphate from the ferric oxide present in the cinder, subsequently reacting the sulphuric acid with the ferric oxide while heating the material approximately to the boiling point of the acid solution, and then removing the undissolved materials present.

WILLIAM S. WILSON.
JOHN F. WHITE.